United States Patent [19]
Kamachi

[11] Patent Number: 5,478,145
[45] Date of Patent: Dec. 26, 1995

[54] SELF-LOCKING MOUNTING BOLT SYSTEMS FOR FURNITURE

[76] Inventor: Kazumi Kamachi, 232-7, Oaza Enotsu, Okawa-shi, Fukuoka-ken, Japan

[21] Appl. No.: 311,712

[22] Filed: Sep. 23, 1994

Related U.S. Application Data

[63] Continuation of Ser. No. 996,163, Dec. 23, 1992, abandoned.

[51] Int. Cl.[6] ................................................ A47B 47/00
[52] U.S. Cl. ...................... 312/263; 312/111; 108/107; 403/245; 211/187
[58] Field of Search .................................. 312/111, 263, 312/265.5, 140; 108/107, 153, 159, 180, 193; 403/231, 245, 409.1; 211/186, 187, 90

[56] References Cited

U.S. PATENT DOCUMENTS

| | | | |
|---|---|---|---|
| 325,696 | 9/1885 | Post | 108/111 |
| 2,258,909 | 10/1941 | Reens | 312/111 X |
| 3,596,942 | 8/1971 | Zoebelein | 211/186 X |
| 4,021,129 | 5/1977 | Sykes | 411/84 X |
| 4,258,464 | 3/1981 | Ullman, Jr. | 403/409.1 X |
| 4,807,926 | 2/1989 | Brunn | 297/33 |

FOREIGN PATENT DOCUMENTS

| | | | |
|---|---|---|---|
| 3401698 | 8/1985 | Germany | 403/231 |

*Primary Examiner*—Brian K. Green
*Attorney, Agent, or Firm*—Jones, Tullar & Cooper

[57] ABSTRACT

A self-locking mounting bolt system for use in mounting shelf boards to side walls of a type employed in furniture. The mounting bolt system includes a plurality of bolts fixedly attached to the side walls, each bolt having a frusto-conical head. The shelf board has formed in each end portion thereof complementary recesses adapted to receive the bolts therein. A larger diameter portion of the bolt head is disposed further away from the side wall than a small diameter portion of the head so that dovetailing of the bolt head and the recess provides the ridigized right angle interconnection of the shelf board and the side walls. Another plate member of equal width to the shelf board may be placed coextensively thereon to clamp the head of the bolts therebetween by means of fasteners.

2 Claims, 5 Drawing Sheets

SELF-LOCKING MOUNTING BOLT SYSTEMS FOR FURNITURE

This is a continuation of application Ser. No. 07/996,163 filed on Dec. 23, 1992, now abandoned.

BACKGROUND OF THE INVENTION

1. Field of the Invention

This invention relates to self-locking mounting bolt systems for mounting shelf boards to side walls of a type employed in furniture, as well as mounting bolts employed in such systems. More particularly, the invention relates to improved self-locking mounting bolt systems which provide for quick and simple assembly and disassembly in the field of various articles of furniture.

2. Description of Prior Art

In a typical mounting dowel system for use with furniture, a plurality of pins are utilized to mount shelf boards to side walls. As is well known in the art, the pins are driven into an end surface of each shelf board or side wall to fit into holes in an abutting side wall or shelf board, respectively, to prevent motion or slipping.

FIG. 1 is a fragumentary, exploded perspective view of an article of furniture such as a chest of drawers. It includes a pair of spaced, generally parallel side walls 10 (only one is shown), and a plurality of horizontal plates including a top plate 12 and two shelf boards 14. Each side wall 10 has two dowel pins 16 projecting from its end surface 18, the pins being generally cylindrical. The pins 16 have root portions received in holes formed in the upper end of the side wall 10. The depth of the holes is generally equal to about a half length of the pins 16. The top plate 12 has a pair of recesses 20 formed in the lower surface thereof, and their depth is also equal to about a half length of the pins 16. The pins 16 are adapted to fit into the complementary recesses 20 in the abutting top plate 12 after application of an adhesive material onto the end surface and the pins.

In a like manner, each shelf board 14 has four pins 24 projecting from an end surface 26 thereof. The pins 24 are adapted to be received in complementary recesses 28 formed in the abutting side wall 10.

Although not shown, it will be appreciated that another conventional method of connecting adjacent plate members together involves the use of studs and nuts. As is well known, a stud, which projects from an end surface of a plate member, is passed through a hole in an abutting plate member, followed by placing and tightening a nut on the stud to secure the abutting plate members.

In the mounting dowel systems, while plates can be successfully rigidized through dowels, it would be impossible to detach the plates in a non-destructive manner in order to disassemble the furniture for later transport and/or reassembly, because an adhesive material is usually applied to the dowels before attachment of the abutting plates.

In recent years there has been an increase in popularity of the concept of manufacturing furniture in a form that permits quick and simple assembly and disassembly in the field. This is partly because of the fact that there are still many multiple dwelling houses in Japan, such as apartments and condominiums, that do not have entrances, corridors, elevator cars, doors, etc. of sufficient widths and heights to allow assembled furniture to pass therethrough into individual rooms. Most of the manufacturers of this type of furniture ship their products to customers in disassembled form and reassemble the furniture in the field.

Additionally, in shipping their products, most manufacturers of furniture, whether of conventional type or of the above-described type, generally use truck services for transport to their customers. However, if the furniture is shipped in assembled form, its bulkiness requires a greater loading space as compared with its weight, resulting in extremely low transport efficiency. Also, a greater storage space is required if the furniture is stored in assembled form.

Accordingly, it is a principal object of this invention to provide improved self-locking mounting bolt systems for use in connecting various plates of a type employed in furniture assembly.

It is another object of this invention to provide improved self-locking mounting bolt systems for use in mounting shelf boards to side walls that provide for quick and simple assembly and disassembly of furniture in the field.

It is a further object of this invention to provide improved self-locking mounting bolt systems which provide for rigidized right angle interconnection of component plates of a type emplyed in furniture.

SUMMARY OF THE INVENTION

The objects stated above and other related objects of this invention are accomplished by the provision of a mounting bolt system for use in mounting a first, generally horizontally disposed plate member to a second, generally vertically disposed plate member, comprising: bolt means fixedly attached to a second, generally vertically disposed plate member and projecting therefrom generally at right angles thereto, each bolt means each including a head having a large diameter portion and a small diameter portion, the large diameter portion of the head of the bolt means being disposed further away from the second plate member than the small diameter portion; and recess means provided in an end portion of a first, generally horizontally disposed plate member, the recess means being complementary in shape to the head of the bolt means, the recess means being adapted to receive the head of the bolt means in such a manner as to rigidize and strengthen the right angle interconnection of first and second plate members.

Further in accordance with this invention, there is provided an article of furniture, comprising: a pair of spaced, generally parallel side walls; at least one shelf board disposed between the side walls generally at right angles thereto; and bolt means fixedly attached to the inside surfaces of the side walls and projecting therefrom generally at right angles thereto, the bolt means each including a head having a large diameter portion and a small diameter portion, the large diameter portion of the head of the bolt means being disposed further away from the side walls than said small diameter portion; the at least one shelf board having recess means provided in each end portion thereof, the recess means being complementary in shape to the head of the bolt means in such a manner as to rigidize and strengthen the right angle interconnection of said side walls and said at least one shelf board.

BRIEF DESCRIPTION OF THE DRAWINGS

In order that the invention can be more clearly understood, convenient embodiments thereof will now be described, by way of example, with reference to the accompanying drawings in which.

BRIEF DESCRIPTION OF THE PREFERRED EMBODIMENTS

Figure 1:
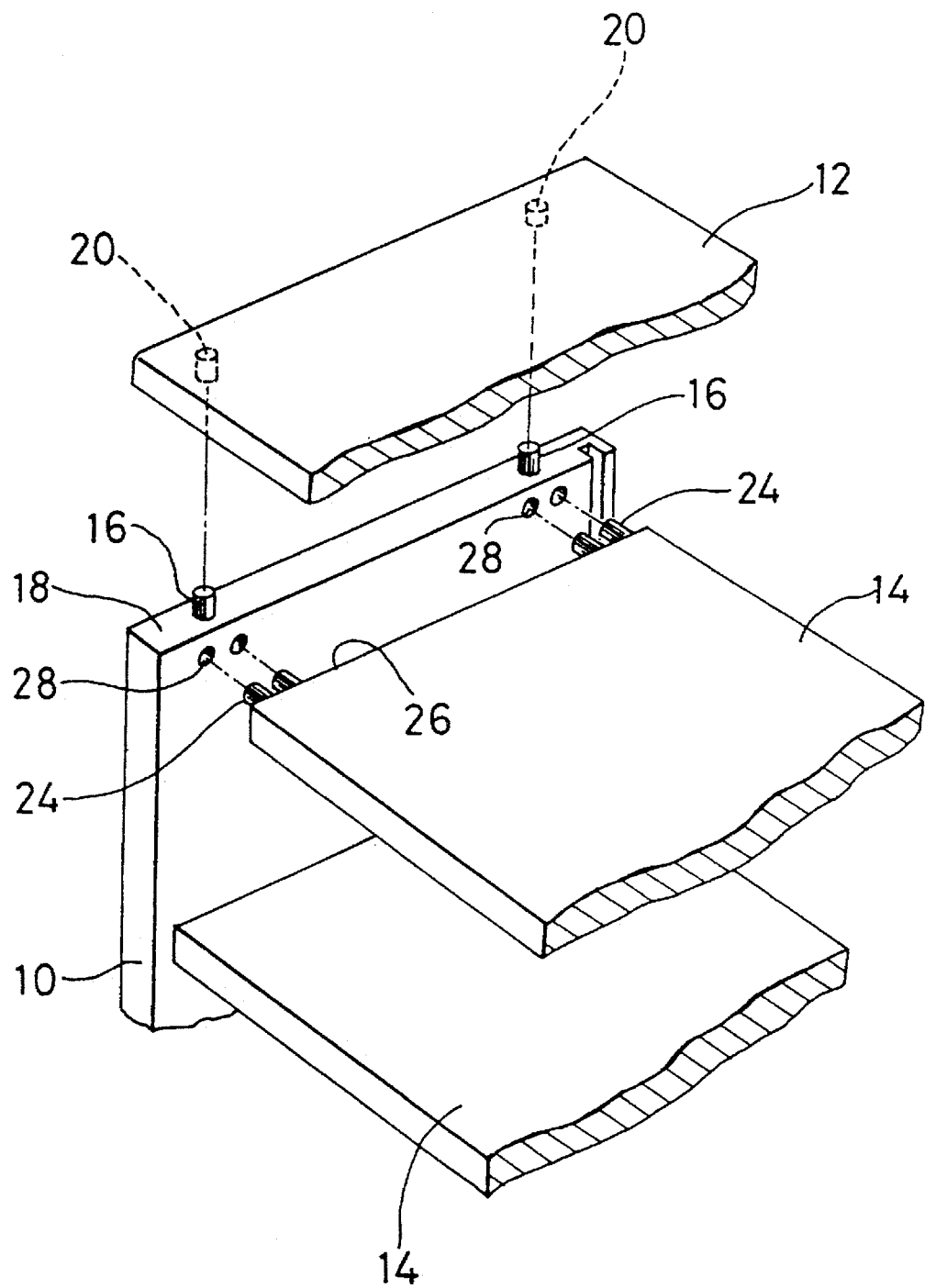
FIG. 1 is a fragmentary exploded perspective view showing a conventional mounting dowel system for use in mounting shelf boards to side walls of an article of furniture.
Figure 2:
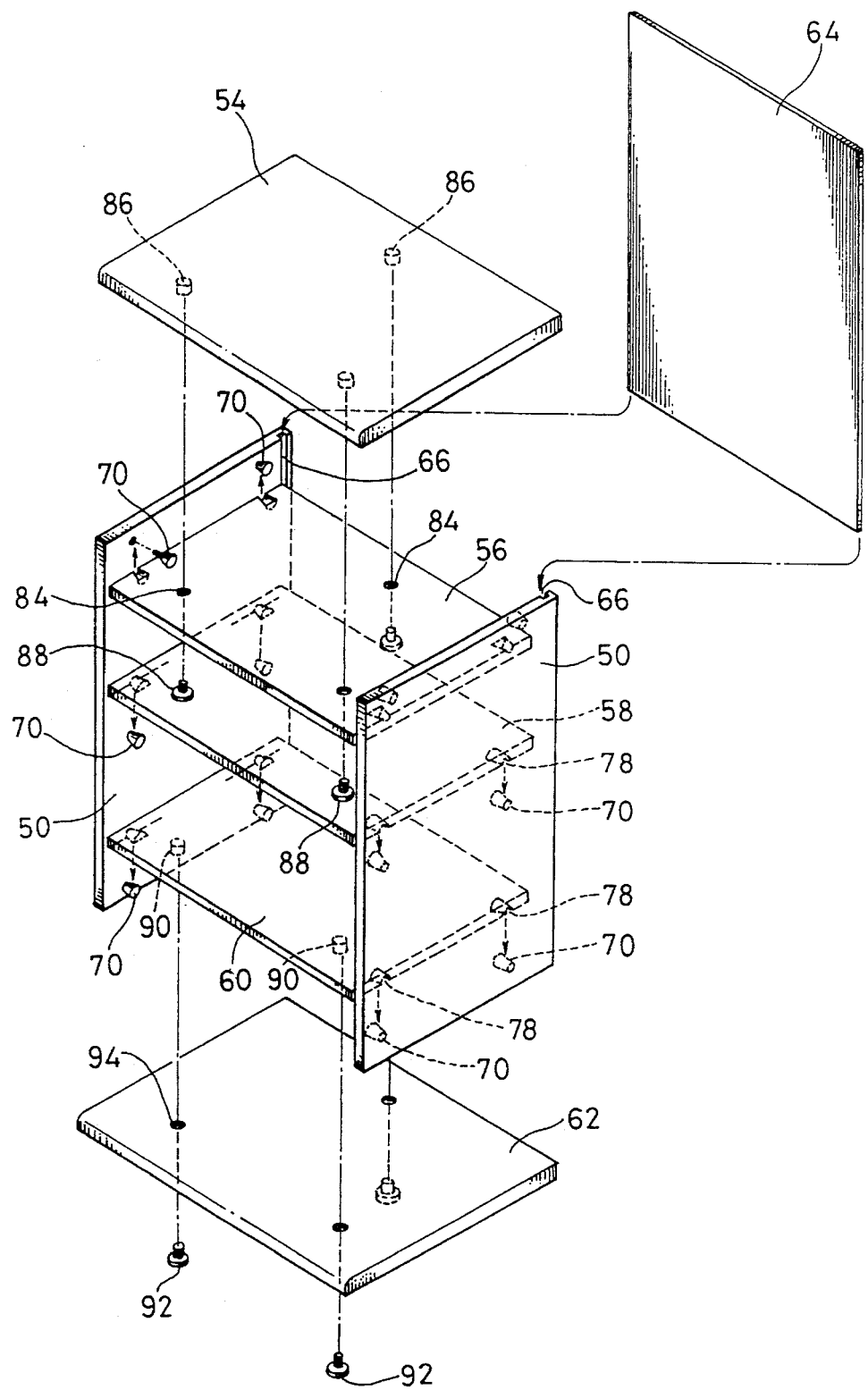
FIG. 2 is an exploded, perspective view of an article of furniture showing the manner in which the self-locking mounting bolt system of this invention is used to connect various component plates together.

Referring now in detail to the drawings, wherein like reference characters represent like parts throughout the several views, there is illustrated in FIG. 2 an article of furniture such as a chest of drawers assembled using the self-locking mounting bolt system of this invention. The chest is comprised of two side walls 50, a top plate 54, three intermediate plates 56, 58, 60, a bottom plate 62 and a back plate 64. The side walls 50 each have a groove 66 formed along the rear end thereof. Each groove 66 is adapted to receive the back plate 64 which is of an equal height to the side walls.

Figure 3:
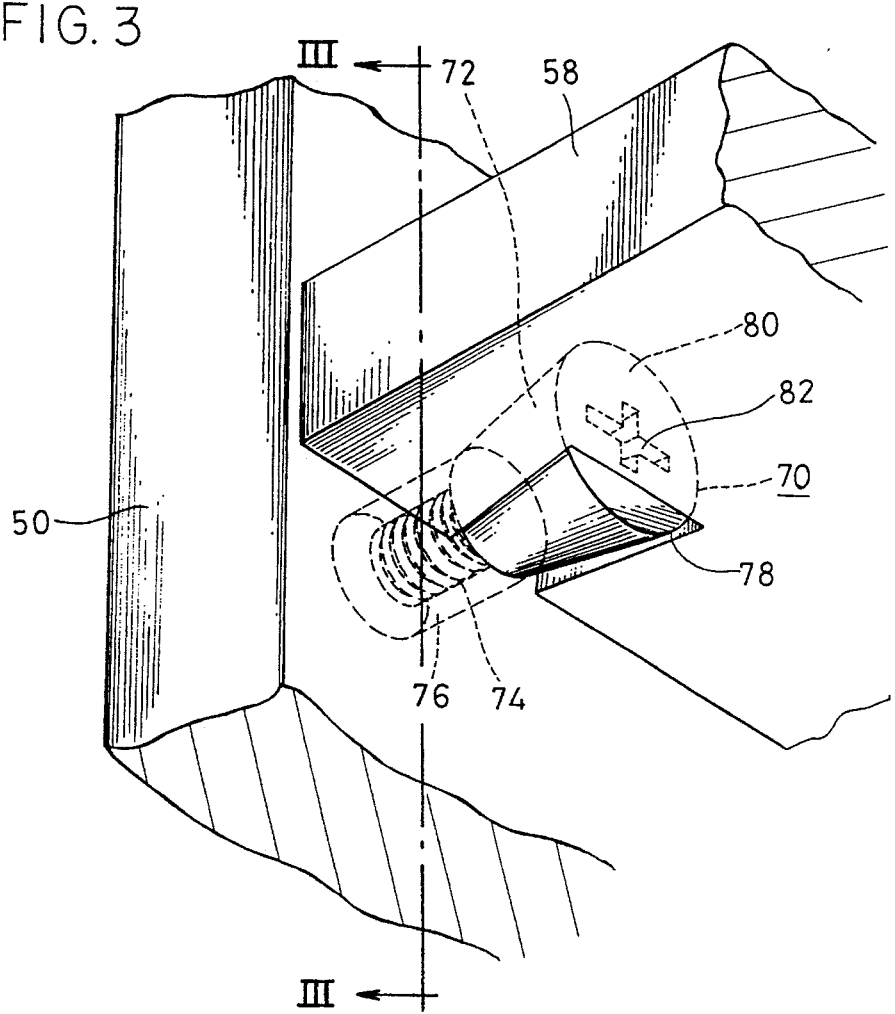
FIG. 3 is an enlarged, fragmentary, perspective view showing the self-locking mounting bolt system of FIG. 2 in detail.
Figure 4:
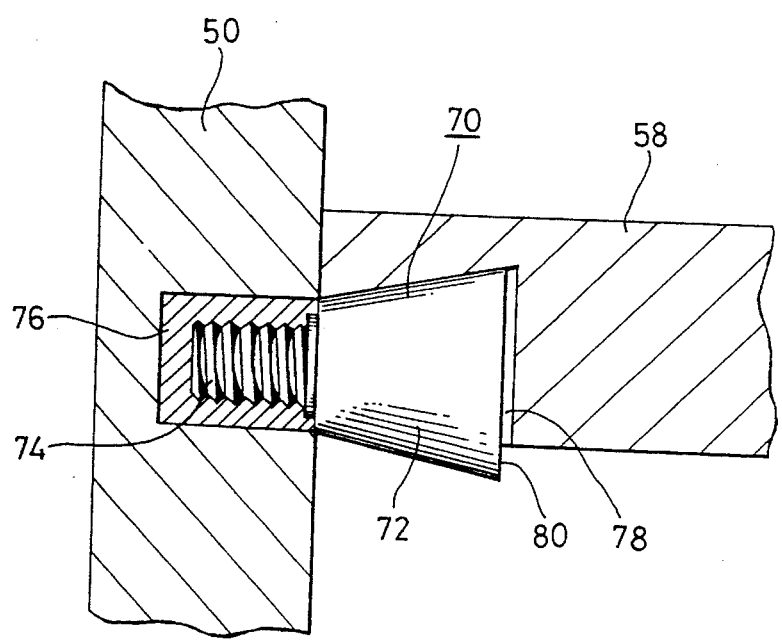
FIG. 4 is a fragmentary sectional view of the self-locking mounting bolt system along the lines III—III of FIG. 3.

The top plate 54, the intermediate plates 56, 58, 60 and the bottom plate 62 are generally of an equal width to each other and are secured in place between the two side walls 50. FIG. 3 is a fragmentary perspective view showing the manner in which one end of the intermediate plate 58 is mounted to one side wall 50 using the mounting bolt system of this invention. FIG. 4 is a sectional view along the lines III—III of FIG. 3.

As best seen in FIG. 3, the mounting bolt system comprises a bolt 70 including a generally frusto-conical head portion 72 and a threaded portion 74, a threaded insert 76, and a complementary recess 78 formed in the intermediate plate 58. The complementary recess 78 is generally of frusto-conical shape. As best seen in FIG. 4, the maximum diameter of the bolt's frusto-conical head portion 72 is slightly greater than the maximum depth of the frusto-conical recess 78 so that the head portion protrudes therefrom. The head portion 72 has a planar top surface 80 provided with a cross recess 82. One of the two intersecting rectangulars comprising the cross recess 82 is longer than the other to allow use of either a plus type or a minus type screw driver.

As will be appreciated by those skilled in the art, the mounting bolt system of this invention has the self-locking capability which serves to rigidize and strengthen the interconnection of the two abutting plates due to the dovetailing of the complementary frusto-conical head portion 72 of the bolt 70 and the recess 78.

Returning to FIG. 2, the intermediate plates 58, 60 each have two complimentary recesses 78 formed in each end portion thereof. These complimentary recesses 78 are formed to face downward so that each intermediate plate is supported on the four bolts 70. On the other hand, the intermediate plate 56 has such complimentary recesses 78 formed in each end portion in a manner to face upward. The intermediate plate 56 also has three holes 84 extending therethrough.

The top plate 54 is of an equal width to the intermediate plate 56 and includes three complementary threaded inserts 86 embedded in the lower surface thereof. These threaded inserts 86 are adapted to receive conventional bolts 88 extending through the holes 84 of the intermediate plate 56. When tightened, the conventional bolts 88 cooperate with the top plate 54 to clamp the head portion of each mounting bolt sandwiched between the top plate and the intermediate plate. With this arrangement, it will be appreciated that the intermediate plate can be firmly secured to the side wall in such a manner as to maintain the rigidized, precise right angle relationship therebetween.

In a like manner, the intermediate plate 60 has four recesses 78 formed in the end portions thereof, and also three threaded inserts 90 embedded in the lower surface thereof. Three bolts 92 of conventional type are provided which extend through complementary holes 94 in the bottom plate 62 so as to be received in the corresponding threaded inserts 90.

As will be apparent from the foregoing, the chest of drawers may be quickly and simply assembled by using the self-locking mounting bolt system of this invention. First, in mounting the intermediate plates to the side walls, the side walls 50 are placed in an opposing relationship to each other after threading the mounting bolts 70 into the complementary threaded inserts 76. The intermediate plate 56 is then placed between the side walls 50 at a level slightly below the mounting bolts 70 of the highest level, while the intermediate plate 58 is placed slightly below the intermediate plate 56 but above the mounting bolts 70 of the intermediate level and also the intermediate plate 60 is placed above the mounting bolts 70 of the lowest level. Thereafter, with the side walls held in the position as shown in FIG. 2, the intermediate plate 56 is moved upward and the intermediate plates 58, 60 are moved downward, in order to force the mounting bolts 70 into the complementary recesses 78 in the intermediate plates.

The next step in assembly of the chest is to slip the back plate 64 down into the grooves 66 in the side walls 50. Then, the top plate 54 and the bottom plate 62 are placed coextensively on the intermediate plates 56 and 60, respectively. The conventional bolts 88, 92 are inserted into the holes 84, 94, respectively, and the bolts are tightened to firmly secure the plates together with the mounting bolts 70 sandwiched therebetween.

With this arrangement, it should be understood that dovetailing of the frusto-conical head portion of each mounting bolt and its complementary recess in the intermediate plates provides for the rigidized, right angle connections of the plates involved.

Figure 5:
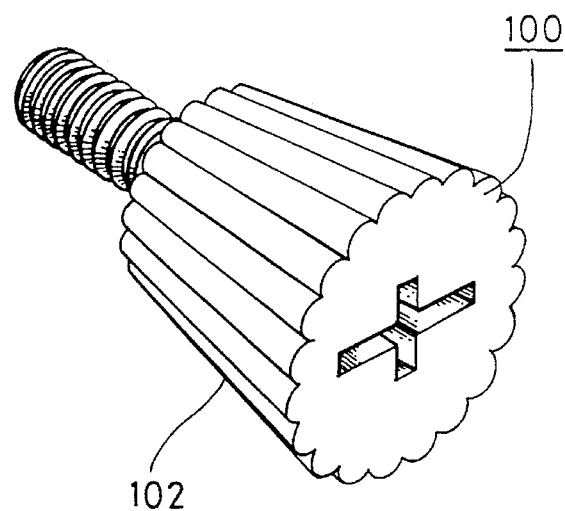
FIG. 5 is a perspective view of a second embodiment of the mounting bolt embodying the invention.
Figure 6:
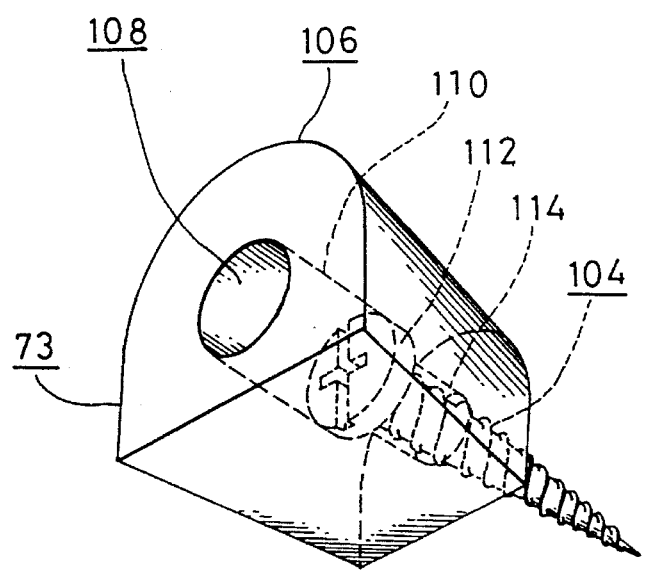
FIG. 6 is a perspective view of a third embodiment of the mounting bolt embodying the invention.

FIGS. 5 and 6 illustrate alternate embodiments for the mounting bolt of this invention. As shown in FIG. 5, this embodiment includes a knurled head 100 having a circumferential surface formed with a plurality of protuberances or knurls 102 to prevent slipping. This knurled bolt eliminates the need to use a screw driver when attaching the bolt to a threaded insert.

The embodiment of FIG. 6 uses a screw 104 and a separate frusto-conical head 106 having a central hole 108. The central hole 108 comprises a first portion 110 of a diameter sufficient to allow passage therethrough of the head 112 of the screw 104 and a second portion 114 of a lessor diameter. The first and second portions are interfaced by a shoulder portion which is adapted to receive the screw head 112 thereon when it is tightened. This embodiment provides the greater flexibility that permits a selection in the field of a point on the side wall where an intermediate plate is attached.

Figure 7:
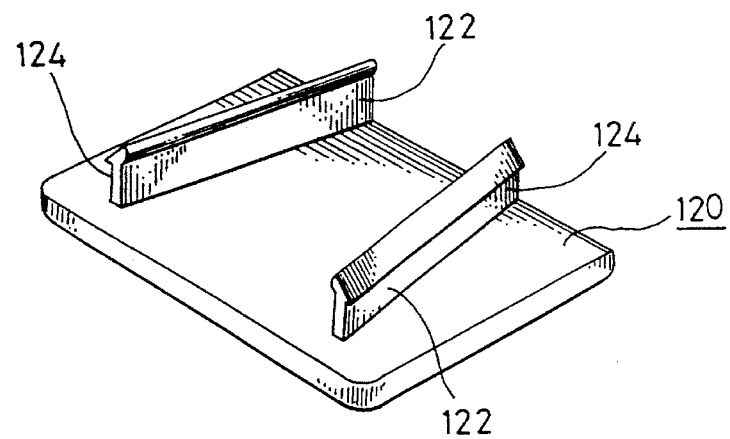
FIG. 7 is a perspective view of a cover employed to shield the mounting bolt from view.
Figure 8:
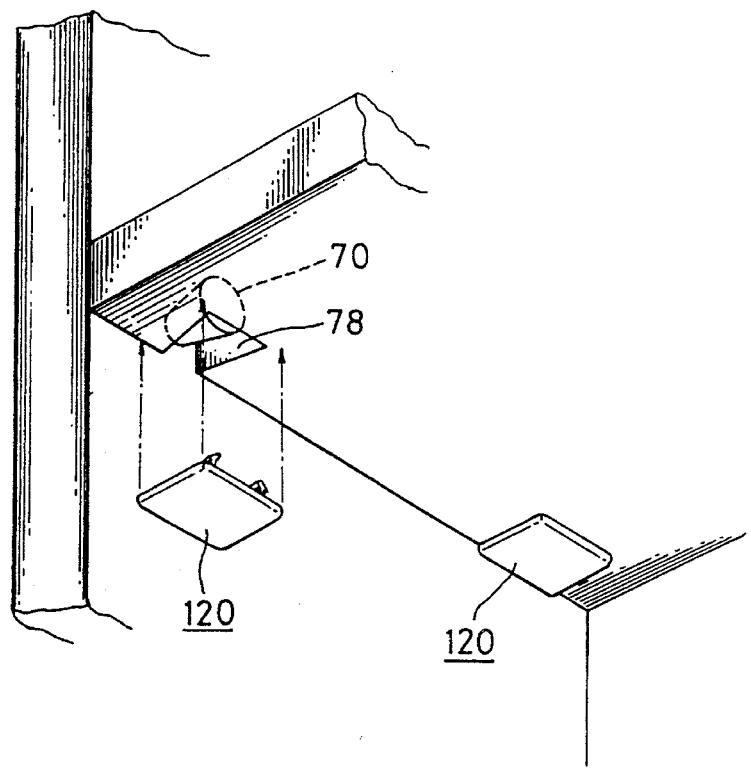
FIG. 8 is a perspective view showing how the cover is used to shield the mounting bolt from view.

FIG. 7 illustrates a generally rectangular cover 120 employed to shield the mounting bolt 70 from view. The cover 120 includes a pair of spaced leg portions 122 on the underside thereof, which generally extend for a length equal to the length of the recess 78 in the shelf boards. Each of the leg portions 122 also includes along the upper edges thereof a hook 124 which serves to retain the cover on the recess. As best seen in FIG. 8, the covers 120 are simply snapped over the recesses 78 and releasably retained thereon by hooks 124 to provide an aesthetically pleasing appearance to the article of furniture employing the mounting bolt system of the present invention.

As will be apparent from the foregoing, the self-locking mounting bolt system of this invention provides for the extremely quick and simply assembly and disassembly of articles of furniture by simply causing the mounting bolts 70 attached to the side wall to fit into the corresponding recesses 78 in the end portion of an intermediate plate. This simplistic and easy operation significantly reduces the time required to mount the shelf boards to the side walls to thereby reduce the overall furniture assembly time, since the requirement for applying an adhesive material onto dowel pins and an end surface of a shelf board has been eliminated.

Although the present invention has been described in terms of what are at present believed to be its preferred embodiments, it will be apparent to those skilled in the art that various changes may be made without departing from the scope of the invention. It is therefore intended that the appended claims cover such changes.

What is claimed:

1. An article of furniture, comprising:

a pair of spaced, generally parallel side walls, each defining an inside surface;

at least one shelf board disposed between said side walls generally at right angles thereto; and a plurality of self-locking bolt means fixedly attached to the inside surfaces of said walls and projecting therefrom generally at right angles thereto, each of said bolt means including a head having a large diameter portion and a small diameter portion, said large diameter portion being disposed further away from said side walls than said small diameter portion;

said at least one shelf board having recess means provided in each end portion thereof, said recess means being complimentary in shape to the head of said bolt means in such a manner as to rigidize and strengthen the interconnection of said side walls and said at least one shelf board, said interconnection forming a right angle interconnection;

the head of each of said bolt means has a maximum diameter and said recess has a maximum depth such that the maximum diameter is slightly greater than the maximum depth of said recess means, so that a portion of the head of said bolt means protrudes from said recess means;

said article of furniture further comprising clamp means for clamping the head of said bolt means to rigidize and strengthen the right angle interconnection of said side walls and said at least one shelf board.

2. An article of furniture as set forth in claim 1 wherein said clamp means comprises a plate member having an equal width to said at least one shelf board, said plate member being adapted to be placed coextensively with said at least one shelf board with the head of said bolt means being situated therebetween; and fastener means for forcing said coextensively disposed shelf board and plate member toward each other.

* * * * *